(12) United States Patent
Garcia et al.

(10) Patent No.: US 12,045,715 B2
(45) Date of Patent: Jul. 23, 2024

(54) ARTIFICIAL NEURAL NETWORK

(71) Applicant: Sony Corporation, Tokyo (JP)

(72) Inventors: Javier Alonso Garcia, Stuttgart (DE);
Fabien Cardinaux, Stuttgart (DE);
Kazuki Yoshiyama, Stuttgart (DE);
Thomas Kemp, Stuttgart (DE);
Stephen Tiedemann, Stuttgart (DE);
Stefan Uhlich, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 1174 days.

(21) Appl. No.: 16/244,183

(22) Filed: Jan. 10, 2019

(65) Prior Publication Data
US 2019/0220741 A1    Jul. 18, 2019

(30) Foreign Application Priority Data
Jan. 12, 2018 (EP) .................... 18151416

(51) Int. Cl.
*G06N 3/08* (2023.01)
*G06N 3/084* (2023.01)
*G06N 5/04* (2023.01)

(52) U.S. Cl.
CPC ............. *G06N 3/08* (2013.01); *G06N 3/084* (2013.01); *G06N 5/04* (2013.01)

(58) Field of Classification Search
None
See application file for complete search history.

(56) References Cited

U.S. PATENT DOCUMENTS

2016/0217368 A1    7/2016    Ioffe et al.
2017/0286830 A1    10/2017    El-Yaniv et al.

OTHER PUBLICATIONS

Ferrer, et al., NeuroFPGA—Implementing Artificial Neural Networks on Programmable Logic Devices, Proceedings of the conference on Design, automation and test in Europe—vol. 3, 2004, pp. 1-6 (Year: 2004).*
Tay Hubara et al: "Quantized Neural Networks: Training Neural Networks with Low Precision Weights and Activations", arxiv.org, Cornell University Library, 201 Olin Library Cornell University Ithaca, NY 14853,Sep. 22, 2016 (Sep. 22, 2016), XP080813052, * p. 6, paragraph 2.4 *.

(Continued)

*Primary Examiner* — Wilbert L Starks
(74) *Attorney, Agent, or Firm* — XSENSUS LLP

(57) ABSTRACT

A computer-implemented method of training an artificial neural network (ANN) by generating a first learned parameter for use in normalising input data values during a subsequent inference phase of the trained ANN. The method includes, for each of a series of batches of training data values, deriving a batch variance of the batch of training data values and a running variance of all training data values already processed in the training phase; generating an approximation of a current value of the first learned parameter so that a first scaling factor dependent upon the approximation of the first learned parameter and the running variance, is constrained to be equal to a power of two; and normalizing the batch of input data values by a second scaling factor dependent upon the approximation of the current value of the first learned parameter and the batch variance.

18 Claims, 6 Drawing Sheets

(56) References Cited

OTHER PUBLICATIONS

European Extended Search Report dated Jun. 13, 2019, issued in corresponding European Patent Application No. 18215628.1.
Courbariaux et al., "Binarized Neural Networks: Training Neural Networks with Weights and Activations Constrained to +1 or −1", Mar. 17, 2016, 11 Pages.
Ioffe et al., "Batch Normalization: Accelerating Deep Network Training by Reducing Internal Covariate Shift", Mar. 2, 2015, pp. 1-11.
R. Rojas, "Neural Networks—A Systematic Introduction—Chapter 7—The Backpropagation Algorithm," Neural Networks, Springer-Verlag, Berlin, New-York, 1996, pp. 151-184.

* cited by examiner

ARTIFICIAL NEURAL NETWORK

CROSS-REFERENCE TO RELATED APPLICATION

The present application claims priority to European Patent Application 18151416.7 filed by the European Patent Office on 12 Jan. 2018, the entire contents of which being incorporated herein by reference.

BACKGROUND

Field

This disclosure relates to artificial neural networks (ANNs).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor implicitly admitted as prior art against the present disclosure.

So-called deep neural networks (DNN), as an example of an ANN, have become standard machine learning tools to solve a variety of problems such as computer vision and automatic speech recognition processing.

In Deep Learning, so-called batch normalization (BN) has become popular, and many successful DNNs contain some BN layers. Batch normalisation relies on the empirical observation that DNNs tend to learn more efficiently when their input features (or in other words, in this context, the data passed from layer to layer of the DNN) are uncorrelated with zero mean and unit variance. Because a DNN may comprise an ordered series of layers, such that one layer receives as input data the output of the preceding layer and passes its output data to form the input to a next layer, batch normalisation acts to normalise, or in this context to convert to zero mean and unit variance, the feature data passed from one layer to another. However, the processing is also based upon learned parameters which act to apply an Affine transform to the data.

The training of learned parameters of a batch normalisation process can involve a backward propagation of errors or "back propagation" process as part of an overall training process by which a so-called loss function is evaluated for the whole ANN. The learned parameters are modified at the training phase so that the loss decreases during the training process.

During inference, BN therefore involves a multiplicative scaling and additive shifting of the feature maps and, therefore, involves at least some multiplications.

SUMMARY

This disclosure provides a computer-implemented method of training an artificial neural network (ANN) by generating a first learned parameter for use in normalising input data values during a subsequent inference phase of the trained ANN, the method comprising:
during an iterative training phase:
for each of a series of batches of training data values,
deriving a batch variance of the batch of training data values and a running variance of all training data values already processed in the training phase;
generating an approximation of a current value of the first learned parameter so that a first scaling factor dependent upon the approximation of the first learned parameter and the running variance, is constrained to be equal to a power of two;
normalising the batch of input data values by a second scaling factor dependent upon the approximation of the current value of the first learned parameter and the batch variance;
deriving an error value; and
updating the first learned parameter in dependence upon a gradient of the error value with respect to the approximation of the first learned parameter.

By this arrangement, the scaling factor that can subsequently be used for inference can be a vector of powers-of-two so that no multiplication is necessarily needed in the BN layer at least during such subsequent inference operations.

The present disclosure also provides computer software which, when executed by a computer, causes the computer to implement the above method.

The present disclosure also provides a non-transitory machine-readable medium which stores such computer software.

The present disclosure also provides a computer-implemented method of operating an artificial neural network (ANN) to process input data values, the method comprising:
during an inference phase:
normalising an input data value by applying a bit shift equivalent to multiplying each input data value by a scaling factor, the scaling factor being a value equal to an integer power of two.

The present disclosure also provides an Artificial neural network (ANN) configured to process input data values, the ANN comprising:
a normalising module to normalise an input data value by applying a bit shift equivalent to multiplying each input data value by a scaling factor, the scaling factor being a value equal to an integer power of two.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE PREFERRED EMBODIMENTS

Figure 1:
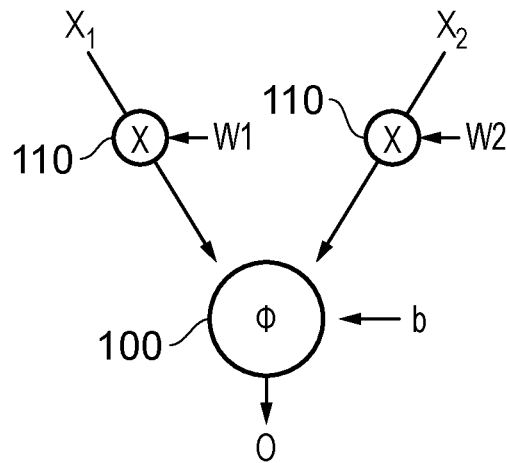
FIG. 1 schematically illustrates an example neuron of an artificial neural network (ANN)

Referring now to the drawings, FIG. 1 schematically illustrates an example neuron 100 of an artificial neural network (ANN). A neuron in this example is an individual interconnectable unit of computation which receives one or more inputs x1, x2 . . . , applies a respective weight w1, w2 . . . to the inputs x1, x2, for example by a multiplicative process shown schematically by multipliers 110 and then adds the weighted inputs and optionally a so-called bias term b, and then applies a so-called activation function Φ to generate an output O. So the overall functional effect of the neuron can be expressed as:

$$O = f(x_i, w_i) = \phi\left(\sum_i (w_i \cdot x_i + b)\right)$$

Here x and w represent the inputs and weights respectively, b is the bias term that the neuron optionally adds, and the variable i is an index covering the number of inputs (and therefore also the number of weights that affect this neuron).

Figure 2:
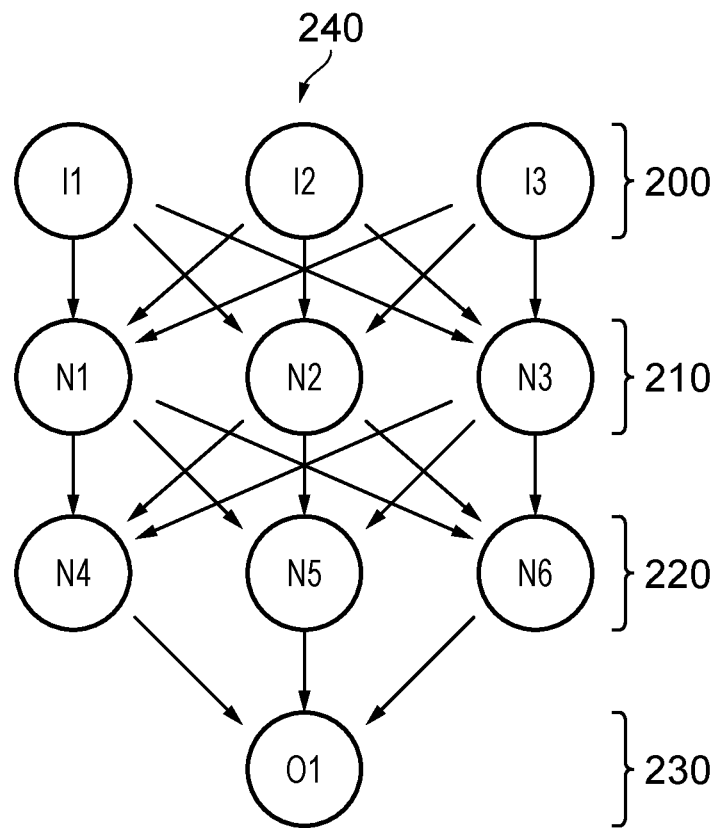
FIG. 2 schematically illustrates an example ANN.

FIG. 2 schematically illustrates an example ANN 240 formed of an array of the neurons of FIG. 1. The examples shown in FIG. 2 comprises an ordered series of so-called fully-connected or Affine layers 210, 220, preceded by an input layer 200 and followed by an output layer 230. The fully connected layers 210, 220 are referred to in this way because each neuron N1 . . . N3 and N4 . . . N6 in each of these layers is connected to each neuron in the next layer.

The neurons in a layer have the same activation function Φ, though from layer to layer, the activation functions can be different.

The input neurons I1 . . . I3 do not themselves normally have associated activation functions. Their role is to accept data from (for example) a supervisory program overseeing operation of the ANN. The output neuron(s) O1 provide processed data back to the supervisory program. The input and output data may be in the form of a vector of values such as:

[x1, x2, x3]

Neurons in the layers 210, 220 are referred to as hidden neurons. They receive inputs only from other neurons and output only to other neurons.

The activation functions is non-linear (such as a step function, a so-called sigmoid function, a hyperbolic tangent (tan h) function or a rectification function (ReLU).)

Training and Inference

Figure 3:
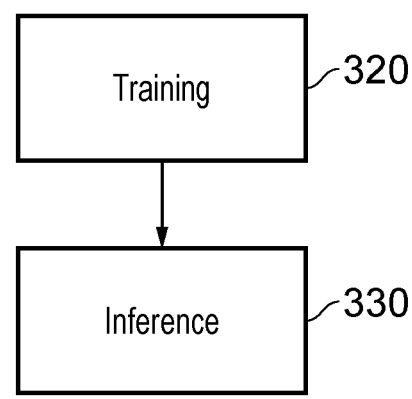
FIG. 3 is a schematic flowchart illustrating a method.

Use of an ANN such as the ANN of FIG. 2 can be considered in two phases, training (320, FIG. 3) and inference (or running) 330.

The so-called training process for an ANN can involve providing known training data as inputs to the ANN, generating an output from the ANN, comparing the output of the overall network to a known or expected output, and modifying one or more parameters of the ANN (such as one or more weights or biases) in order to aim towards bringing the output closer to the expected output. Therefore, training represents a process to search for a set of parameters which provide the lowest error during training, so that those parameters can then be used in an operational or inference stage of processing by the ANN, when individual data values are processed by the ANN.

An example training process includes so-called back propagation. A first stage involves initialising the parameters, for example randomly or using another initialisation technique. Then a so-called forward pass and a backward pass of the whole ANN are iteratively applied. A gradient or derivative of an error function is derived and used to modify the parameters.

At a basic level the error function can represent how far the ANN's output is from the expected output, though error functions can also be more complex, for example imposing constraints on the weights such as a maximum magnitude constraint. The gradient represents a partial derivative of the error function with respect to a parameter, at the parameter's current value. If the ANN were to output the expected output, the gradient would be zero, indicating that no change to the parameter is appropriate. Otherwise, the gradient provides an indication of how to modify the parameter to achieve the expected output. A negative gradient indicates that the parameter should be increased to bring the output closer to the expected output (or to reduce the error function). A positive gradient indicates that the parameter should be decreased to bring the output closer to the expected output (or to reduce the error function).

Gradient descent is therefore a training technique with the aim of arriving at an appropriate set of parameters without the processing requirements of exhaustively checking every permutation of possible values. The partial derivative of the error function is derived for each parameter, indicating that parameter's individual effect on the error function. In a backpropagation process, starting with the output neuron(s), errors are derived representing differences from the expected outputs and these are then propagated backwards through the network by applying the current parameters and the derivative of each activation function. A change in an individual parameter is then derived in proportion to the negated partial derivative of the error function with respect to that parameter and, in at least some examples, having a further component proportional to the change to that parameter applied in the previous iteration.

An example of this technique is discussed in detail in the following publication http://page.mi.fu-berlin.de/rojas/neural/ (chapter 7), the contents of which are incorporated herein by reference.

Batch Normalisation

It has been found empirically and reported in the paper Ioffe, S. & Szegedy, C. (2015). Batch Normalization: Accelerating Deep Network Training by Reducing Internal Covariate Shift. (cite arxiv:1502.03167) and in Ioffe et al U.S. 2016/0217368 A1, the contents of both of which are incorporated herein by reference, that ANNs can be potentially trained more efficiently when the input data or "features" to a layer are uncorrelated with zero mean and unit variance. Because each layer of the ANN receives the output of the preceding layer as its inputs, a so-called batch normalisation process can be used to transform or normalise its own inputs into a form having zero mean and unit variance. The batch normalisation process also involves the application of learned parameters (discussed below) and so can also apply an element-wise Affine transform so that the output of the batch normalisation process need not necessarily have zero mean and unit variance.

Figure 4:
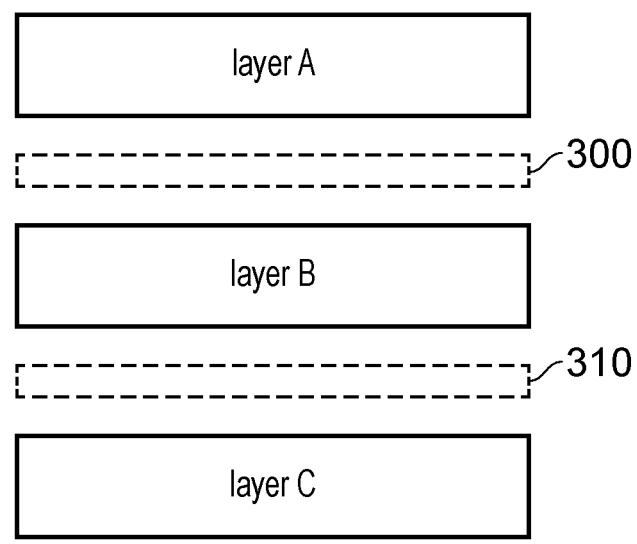
FIG. 4 schematically illustrates at least a part of an ANN.

Referring to FIG. 4, a part of an ordered series of layers is illustrated (in which a forward propagation direction is represented vertically down the page) having layers A, B, C in that (forward) order. The batch normalisation process can be carried out at schematic positions such as positions 300 (at the input to layer B) or 310 (at the output of layer B, the input to layer C).

In examples, the arrangement of FIG. 4 can provide an example of an Artificial neural network (ANN) generated by the method to be described below.

In brief, the batch normalisation process as used during inference includes a stage of multiplying each data value by a quantity (which may be dependent on the variance of data values used in training), and adding or subtracting a quantity (which may be dependent upon the mean of data values used in training), so as to allow a unit variance and zero mean to be achieved. However, as mentioned above these quantities are also modified by learned parameters which can be trained by the training phase including a backpropagation process as discussed above. The learned parameters can vary the effect of the normalisation and depending on the learned values acquired in training, can in principle undo or otherwise change its effect. So the network can arrive at a normalisation process which best suits the data in use. The learned parameters may for example be initialised to provide zero mean and unit variance but are then allowed to vary from this arrangement.

Training Phase Example

Figure 5:
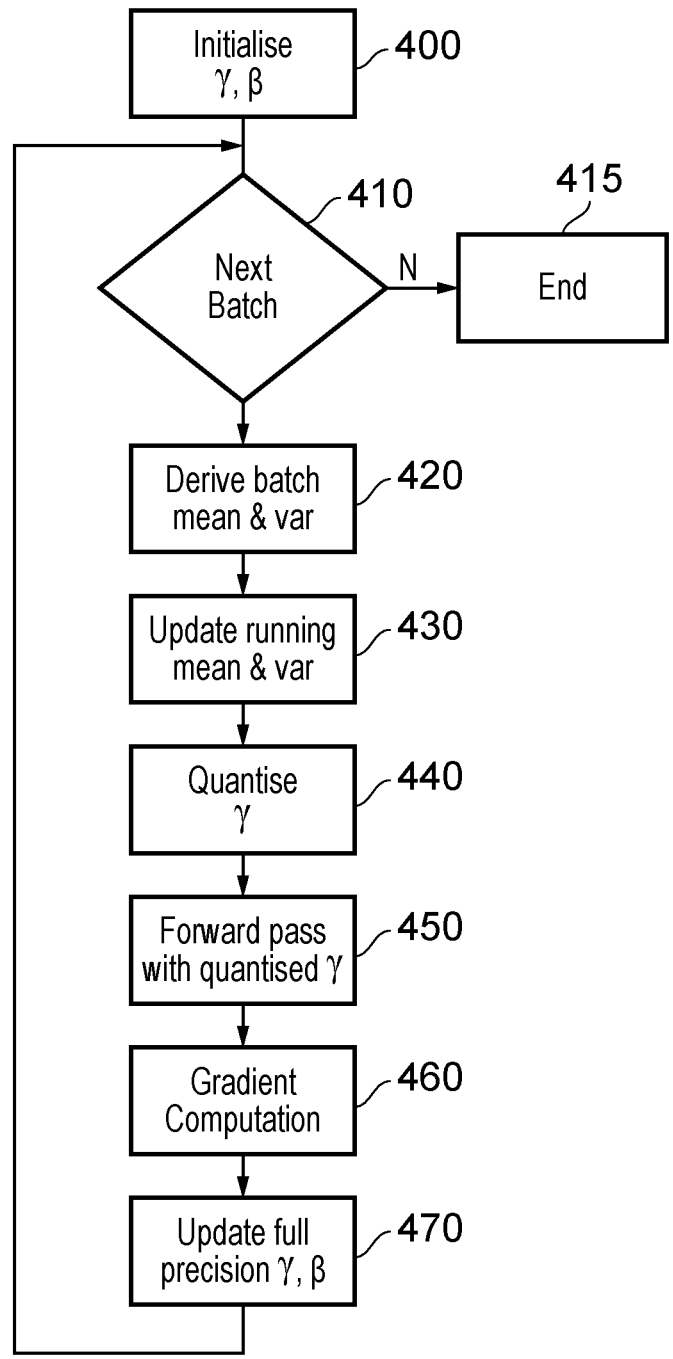
FIG. 5 is a schematic flowchart illustrating a method.

An example of the training phase of the batch normalisation process is shown in the schematic flowchart of FIG. 5, though it is noted that at least some instances of steps shown in series could in fact be carried out in parallel.

In the following the input to the BN layer is the vector $x \in R^o$ and the output is the vector $y \in R^o$. The formulas shown below use the element of index o ("$x_o$") of the input vector, and are meant to be applied element-wise for every element of the input vector x.

At a step 400, the learned parameters $\gamma_o$ and $\beta_o$ are initialised, for example randomly, or to values which will give a unit variance and zero mean, or to other initial values. The process which follows allows for learning to take place starting from those initial values.

The training is conducted using batches, each of multiple data values. Multiple batches may be used in the entire training process, and an individual batch may be used more than once. At a step 410, if all available batches have been used, the process ends at a step 415. Otherwise the training process continues. In some contexts, the batch of data used in a single iteration of the flowchart of FIG. 5 may be referred to as a "minibatch", to distinguish it from the overall training data set. However, the term "batch" will be used here.

At a step 420, a batch mean, $\mu_B$ and batch variance (square of the standard deviation $\sigma_B$) are derived from the data in the current batch B.

At a step 430, a running mean and variance $E[x_o]$ and $Var[x_o]$ are updated. These represent the mean and variance applicable to all of the m training data values processed so far:

$$E[x_0] = \frac{1}{m} \sum_{i=1}^{m} x_{o_i}$$

$$Var[x_o] = \frac{1}{m} \sum_{i=1}^{m} (x_{o_i} - E[x_0])^2$$

The batch normalisation process (which will be applied at the step 450 to be discussed below) can be represented by the expression:

$$y_o = \alpha_o \cdot x_o + b_o$$

where $$\alpha_o = \frac{\gamma_o}{\sqrt{Var[x_o] + \epsilon}}$$

and $$b_o = \beta_o - \frac{\gamma_o E[x_o]}{\sqrt{Var[x_o] + \epsilon}}$$

In other words, it involves multiplying an input data sample by a parameter $\alpha_o$ and adding a parameter $b_o$. Note that the multiplier factor $\alpha_o$ depends on the learned parameter $\gamma_o$. At a step 440, the learned value $\gamma_o$ is quantised or approximated to a value $\hat{\gamma}_o$ such that $\alpha =$ $$\frac{\gamma}{\sqrt{Var[x] + \epsilon}}$$

is quantized to $\hat{\alpha}$, and the resulting $\hat{\alpha}$ is a power-of-two number, i.e., (for the element of index o):

$$\hat{\alpha_o} = \text{sign}(\alpha_o) \cdot 2^{round(log2|\alpha_o|)}$$

and $$\hat{\gamma}_o = \text{sign}(\alpha_o) \cdot 2^{round(log2|\alpha_o|)} \cdot \sqrt{Var[x_o] + \epsilon}$$

At a step 450, a forward pass is conducted, in which (for the BN layer in question) the batch of training data values are normalised to generate normalised data $\gamma_o$ and are scaled and shifted by learned parameters $\gamma_o$ and $\beta_o$ respectively:

$$y = \hat{\gamma} \frac{x - \mu_B}{\sigma_B} + \beta$$

where $\hat{\gamma}$ (approximated version of $\gamma$) is computed so that $$\frac{\hat{\gamma}}{\sigma_T}$$

is a power-of-two. In these formulas, $\mu_B$ and $\sigma_B$ are the mean and standard deviations of the data in the batch B, while $\sigma_T = \sqrt{Var[x] + \epsilon}$ is the running standard deviation from the whole training set processed so far (the m training data values). Here, $\epsilon$ is an arbitrarily small constant to avoid division by zero. Thus, $\sigma_T$ is the standard deviation which, at the end of the training (after all batches of data have been processed), will actually be used for inference. Note that, during training time, $$\frac{\hat{\gamma}}{\sigma_B}$$

is not necessarily an exact power-of-two. However, the arrangement $\hat{\gamma}$ such that $$\hat{\alpha} = \frac{\hat{\gamma}}{\sigma_T},$$

which will be used at inference time, is a power-of-two (here, in training, the prevailing running variance is used, and at inference, the final running variance applicable to the entire training phase is used). Therefore, this involves approximating γ (as an approximation of a current value of the learned parameter) so that a first scaling factor (to be used during inference) dependent upon the approximation of the first learned parameter and the running variance, is constrained to be equal to a power of two.

The mean and variance used in this forward pass at step 450 are the current batch values $\mu_B$ and $\sigma_B^2$ so that the normalising the batch of input data values is performed by multiplying each input data value by a second scaling factor dependent upon the approximation of the current value of the first learned parameter and the batch variance. However, the process for the approximation of γ explained above is dependent upon the running variance rather than the batch variance.

As mentioned above, the learned parameters γ and β are provided and trained as a vector of values, one for each vector element in the input data, and batch normalisation is carried out separately for the different vector elements in the data.

At a step 460, a gradient computation takes place to compute the error and gradient with respect to $\hat{\gamma}$ (the approximated value for γ) and also to compute the gradient of the error with respect to β

At a step 470, the full precision (not approximated) prevailing value of γ and the prevailing value of β are updated according to the detected gradients.

After the final batch has been processed (the negative outcome from the step 410) this is the completion of the training of the batch normalisation process, as the learned parameters γ and β have been trained to their values for use at inference. Note that at inference, the process uses β and $\hat{\gamma}$, the quantized version of γ

By this training scheme, it is ensured that the resulting $\hat{\alpha}$ at the end of training is a vector of powers-of-two and no multiplication will be needed in the batch normalization layer during inference time. Note the embodiment can achieve a saving of multiplications during inference time, rather than at training time.

Inference Phase

Figure 6:
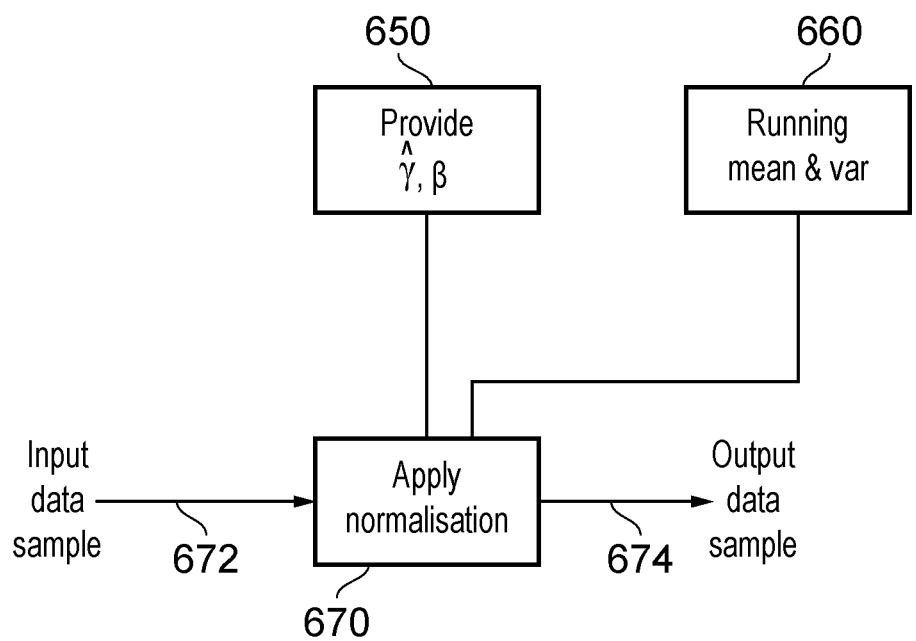
FIG. 6 is a schematic flowchart illustrating a method.

FIG. 6 schematically illustrates the inference phase of the BN layer in question. Rather than a batch-based process, this generally operates on individual data values using the parameters learned for the BN layer.

The final values of the running mean E[x] and running variance Var[x] of the training data set are provided at a step 660.

The learned parameters $\hat{\gamma}$ and β from the training phase are provided at step 650

An input data value 672 is processed to generate an output data value 674 by the trained BN layer at a step 670 by applying the function:

$$y_o = \alpha_o \cdot x_o + b_o = \frac{\gamma_o}{\sqrt{\text{Var}[x_o] + \epsilon}} \cdot x_o + \beta_o - \frac{\gamma_o E[x_o]}{\sqrt{\text{Var}[x_o] + \epsilon}}$$

where γ is set to $\hat{\gamma}$ and accordingly α to $\hat{\alpha}$, which is to say, the process uses $\hat{\gamma}$, the quantized or approximated version of γ.

At inference time $b_o$ is a constant since $\beta_o$ and $\hat{\gamma}_o$ (the learned parameters) are constant and the final values of the running mean and variance (E[$x_o$] and Var[$x_o$]) are also constant.

By the training scheme described above, it is ensured that that the resulting $$\hat{\alpha} = \frac{\hat{\gamma}}{\sqrt{\text{Var}[x] + \epsilon}},$$

which is used for interference, is always a vector of powers-of-two numbers and no multiplication is needed in the BN layer during inference time.

In summary, applying the terminology of FIGS. 5 and 6 to the processes discussed above:

| | |
|---|---|
| first learned parameter | γ |
| approximation of the first learned parameter | $\hat{\gamma}$ |
| first scaling factor (uses prevailing value of running variance in training, final value of running variance at inference) | $\frac{\hat{\gamma}}{\sigma_T}$ |
| second scaling factor | $\frac{\hat{\gamma}}{\sigma_B}$ |
| second learned parameter | β |

Figure 7:
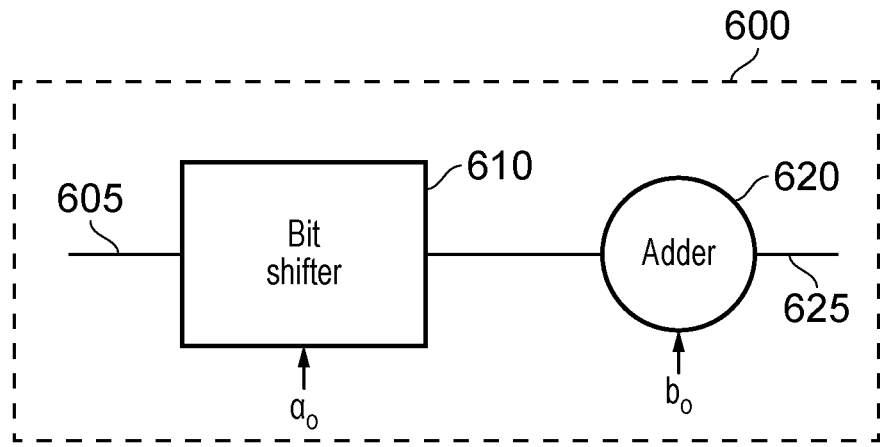
FIG. 7 schematically illustrates a processing element.
Figure 8:
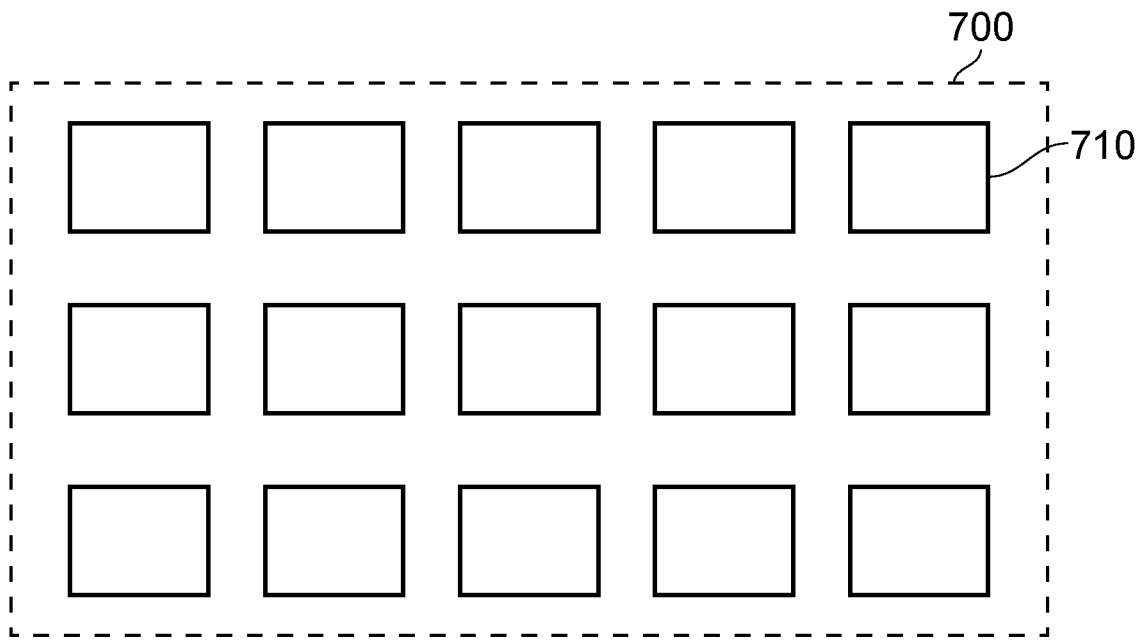
FIG. 8 schematically illustrates a processing apparatus.

FIG. 7 schematically illustrates a multiplier-less processing element suitable for performing batch normalization of the type discussed above, at inference time. The element 600 comprises a bit shifter operable to bit shift an input data value 605 by a bit shift amount dependent upon the parameter $\alpha_o$ discussed above, and an adder 620 operable to add a parameter $b_o$ discussed above, so as to generate a batch normalized output value 625. FIG. 8 schematically illustrates an apparatus 700 comprising an array of interconnected processing elements 710 for implementing an ANN, at least those processing elements 710 used for batch normalization being of the type shown in FIG. 7. The apparatus of FIG. 8 can provide an example of data processing apparatus comprising one or more processing elements to implement the ANN discussed above, for example the apparatus comprising a set of logic elements 710, the set of logic elements not including multiplier elements.

Figure 9:
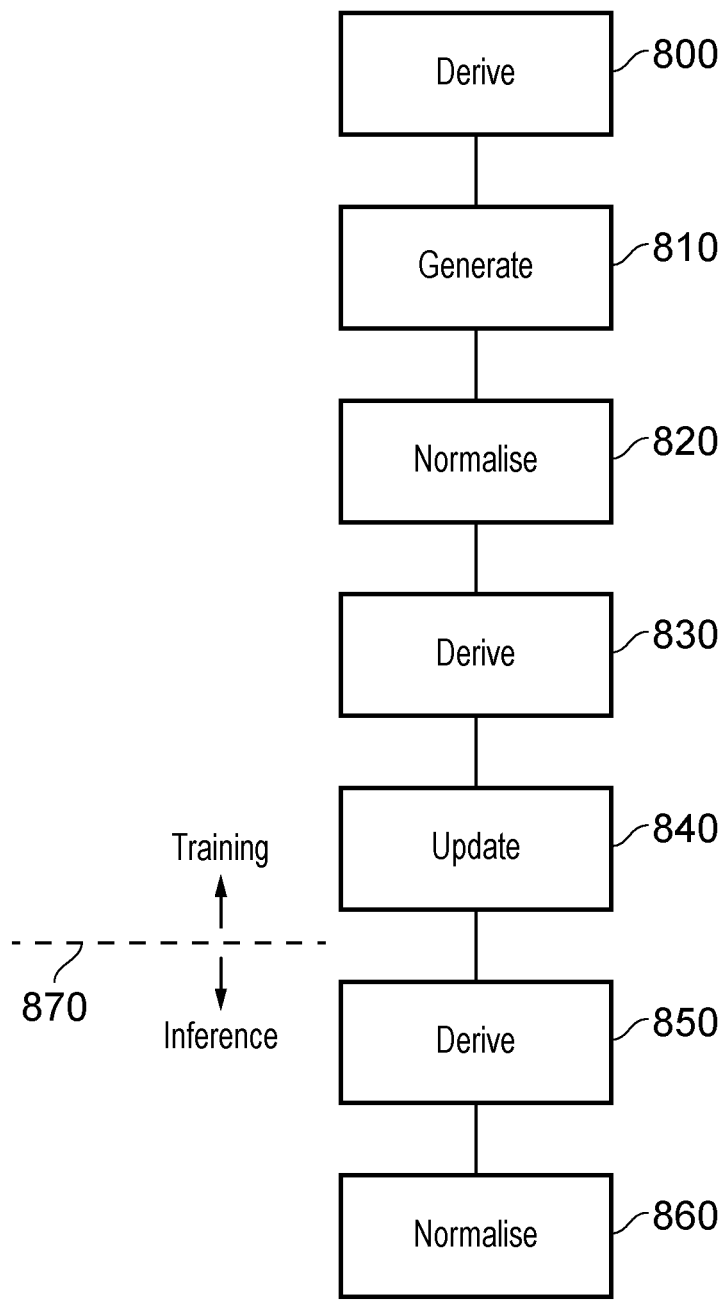
FIG. 9 is a schematic flowchart illustrating a method.

FIG. 9 is a schematic flowchart illustrating a computer-implemented method of training an artificial neural network (ANN) by generating a first learned parameter for use in normalising input data values during a subsequent inference phase of the trained ANN, the method comprising:

during an iterative training phase:
  for each of a series of batches of training data values,
    deriving (at a step 800) a batch variance of the batch of training data values;
  generating (at a step 810) an approximation of a current value of the first learned parameter so that a first scaling factor dependent upon the approximation of the first learned parameter and the running variance, is constrained to be equal to a power of two;
  normalising (at a step 820) the batch of input data values by a second scaling factor dependent upon the approximation of the current value of the first learned parameter and the batch variance;
  deriving (at a step 830) an error value; and
  updating (at a step 840) the first learned parameter in dependence upon a gradient of the error value with respect to the approximation of the first learned parameter.

As illustrated schematically by a dividing line 870, the training process may be considered to be represented by the steps 800-840. The result or outcome is a trained ANN which can subsequently (and potentially separately) be used in inference.

For ease of explanation, the inference phase (shown below the schematic divider 870 in FIG. 9) is shown as a subsequent phase to the training phase, but once again it will be appreciated that training and inference can be separate stages, performed for example by separate entities.

The steps 850, 860 of FIG. 9 provide a schematic representation of a method of operating an ANN trained according to the method of steps 800-840, comprising, during an inference phase:

deriving (at the step 850) the first scaling factor in dependence upon the approximation of the first learned parameter and a running variance of all training values applicable to the entire training phase; and normalising (at the step 860) an input data value by applying a bit shift equivalent to multiplying each input data value by the first scaling factor.

Separately, the steps 850-860 may provide an example of a stand-alone computer-implemented method of operating an artificial neural network (ANN) to process input data values, the method comprising:

during an inference phase:

normalizing an input data value by applying a bit shift equivalent to multiplying each input data value by a scaling factor, the scaling factor being a value equal to an integer power of two. In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Various respective aspects and features will be defined by the following numbered clauses:

1. A computer-implemented method of training an artificial neural network (ANN) by generating a first learned parameter for use in normalising input data values during a subsequent inference phase of the trained ANN, the method comprising:

during an iterative training phase:

for each of a series of batches of training data values, deriving a batch variance of the batch of training data values and a running variance of all training data values already processed in the training phase;

generating an approximation of a current value of the first learned parameter so that a first scaling factor dependent upon the approximation of the first learned parameter and the running variance, is constrained to be equal to a power of two;

normalising the batch of input data values by a second scaling factor dependent upon the approximation of the current value of the first learned parameter and the batch variance;

deriving an error value; and updating the first learned parameter in dependence upon a gradient of the error value with respect to the approximation of the first learned parameter.

2. A method according to clause 1, the ANN having an ordered series of two or more successive layers of neurons, each layer passing data signals to the next layer in the ordered series, the neurons of each layer processing the data signals received from the preceding layer according to an activation function.

3. A method according to clause 1 or clause 2, comprising, during the training phase:

for each of the series of batches of training data values, deriving a batch mean of the batch of training data values and a running mean of all training data values already processed in the training phase and in which, during the training phase:

the normalising step comprises adding an offset value dependent upon at least the approximation of the first learned parameter, a second learned parameter and the batch mean; and the updating step comprises updating the second learned parameter in dependence upon a gradient of the error value with respect to the approximation of the second learned parameter.

4. A method according to any one of the preceding clauses, in which the step of normalising the batch of input data values comprises multiplying each input data value by the second scaling factor.

5. A method according to any one of the preceding clauses, in which the first scaling factor $\alpha_0$ is chosen to be:

$$\alpha_0 \equiv \hat{\alpha}_0 = \frac{\hat{\gamma}_o}{\sqrt{\mathrm{Var}[x_o]+\epsilon}}$$

where:

$\mathrm{Var}[x_0]$ is the running variance of the training data values $x_{0i}$:

$$\mathrm{Var}[x_0] = \frac{1}{m}\sum_{i=1}^{m}(x_{o_i} - E[x_0])^2$$

$\epsilon$ is a constant; and $\hat{\gamma}_o$ is the approximation of the first learned parameter, given by:

$$\hat{\gamma}_o = \mathrm{sign}(\alpha_o) \cdot 2^{round(log2|\alpha_o|)} \cdot \sqrt{\mathrm{Var}[x_o]+\epsilon}$$

where sign (argument) represents the sign of the argument and round (argument) represents a rounding of the argument to the closest integer.

6. A method according to any one of the preceding clauses, in which:

the input data values comprise vector data values each having a plurality of elements; and the first learned parameter comprises a vector value having a plurality of elements, one element for each element of the input data values.

7. A method of operating an ANN trained according to the method of any one of the preceding clauses, comprising, during an inference phase:
   deriving the first scaling factor in dependence upon the approximation of the first learned parameter and a running variance of all training values applicable to the entire training phase; and
   normalising an input data value by applying a bit shift equivalent to multiplying each input data value by the first scaling factor.

8. A method according to clause 7, in which, during the inference phase:
   the normalising step comprises adding an offset value dependent upon at least a second learned parameter, the approximation of the first learned parameter and a the running mean applicable to the entire training phase of all training data values processed by the training phase.

9. Computer software which, when executed by a computer, causes the computer to implement the method of any one of the preceding clauses.

10. A non-transitory machine-readable medium which stores computer software according to clause 9.

11. An Artificial neural network (ANN) trained by the method of any one of clauses 1 to 6.

12. Data processing apparatus comprising one or more processing elements to implement the ANN of clause 11.

13. A computer-implemented method of operating an artificial neural network (ANN) to process input data values, the method comprising:
   during an inference phase:
   normalising an input data value by applying a bit shift equivalent to multiplying each input data value by a scaling factor, the scaling factor being a value equal to an integer power of two.

14. Computer software which, when executed by a computer, causes the computer to implement the method of clause 13.

15. A non-transitory machine-readable medium which stores computer software according to clause 14.

16. An Artificial neural network (ANN) configured to process input data values, the ANN comprising:
   a normalising module to normalise an input data value by applying a bit shift equivalent to multiplying each input data value by a scaling factor, the scaling factor being a value equal to an integer power of two.

17. Data processing apparatus comprising one or more processing elements to implement the ANN of clause 16.

18. Apparatus according to clause 17, the apparatus comprising a set of logic elements, the set of logic elements not including multiplier elements.

The invention claimed is:

1. A computer-implemented method of training an artificial neural network (ANN) by generating a first learned parameter for use in normalizing input data values during a subsequent inference phase of the trained ANN, the method comprising:
   performing an iterative training phase to train the artificial neural network (ANN), the performing of the iterative training phase including iterative training including:
   collecting a series of batches of training data values;
   for each of the series of batches of training data values,
   deriving a batch variance of the batch of training data values and a running variance of all training data values already processed in the iterative training phase;
   generating an approximation of a current value of the first learned parameter so that a first scaling factor dependent upon the approximation of the first learned parameter and the running variance, is constrained to be equal to a power of two;
   normalizing the batch of input data values by a second scaling factor dependent upon the approximation of the current value of the first learned parameter and the batch variance;
   deriving an error value; and
   updating the first learned parameter in dependence upon a first gradient of the error value with respect to the approximation of the first learned parameter; and
   training the artificial neural network (ANN) by repeating the iterative training until the iterative training has used all of the batches of training data values of the series of batches of training data values.

2. A method according to claim 1, wherein, for the artificial neural network (ANN) having an ordered series of two or more successive layers of neurons, each layer passing data signals to the next layer in the ordered series, the neurons of each layer processing the data signals received from the preceding layer according to an activation function.

3. A method according to claim 1, comprising, during the training phase:
   for each of the series of batches of training data values,
   deriving a batch mean of the batch of training data values and a running mean of all training data values already processed in the training phase, and
   in which, during the training phase:
   said normalizing includes adding an offset value dependent upon at least the approximation of the first learned parameter, a second learned parameter and the batch mean; and
   said updating includes updating the second learned parameter in dependence upon a second gradient of the error value with respect to the approximation of the second learned parameter.

4. A method according to claim 1, in which the step of normalizing the batch of input data values comprises multiplying each input data value by the second scaling factor.

5. A method according to claim 1, in which the first scaling factor ao is chosen to be:

$$\alpha_0 \equiv \hat{\alpha}_0 = \frac{\hat{\gamma}_o}{\sqrt{\text{Var}[x_o] + \epsilon}}$$

where:

$$\text{Var}[x_0] = \frac{1}{m}\sum_{i=1}^{m}(x_{o_i} - E[x_0])^2$$

$\epsilon$ is a constant; and
$\hat{\gamma}_o$ is the approximation of the first learned parameter, given by:

$$\hat{\gamma}_o = \text{sign}(\alpha_o) \cdot 2^{round(log2|\alpha_o|)} \cdot \sqrt{\text{Var}[x_o] + \epsilon}$$

where sign (argument) represents the sign of the argument and round (argument) represents a rounding of the argument to the closest integer.

6. A method according to claim 1, in which:
the input data values comprise vector data values each having a plurality of elements; and
the first learned parameter comprises a vector value having a plurality of elements, one element for each element of the input data values.

7. A method of operating an artificial neural network (ANN) trained according to the method of claim 1, comprising, during an inference phase:
deriving, using the artificial neural network (ANN), the first scaling factor in dependence upon the approximation of the first learned parameter and a running variance of all training values applicable to the entire training phase; and
normalizing, using the artificial neural network (ANN), an input data value by applying a bit shift equivalent to multiplying each input data value by the first scaling factor.

8. A method according to claim 7, in which, during the inference phase:
the normalizing step comprises adding an offset value dependent upon at least a second learned parameter, the approximation of the first learned parameter and the running mean applicable to the entire training phase of all training data values processed by the training phase.

9. Computer software which, when executed by a computer, causes the computer to implement the method of claim 1.

10. A non-transitory machine-readable medium which stores computer software according to claim 9.

11. An Artificial neural network (ANN) trained by the method of claim 1.

12. Data processing apparatus comprising one or more processing elements to implement the artificial neural network (ANN) of claim 11.

13. A non-transitory computer-readable storage medium having stored thereon instructions that, when executed by one or more processors, causes the one or more processors to perform a method of operating a machine learning model in the form of an artificial neural network (ANN) to process a plurality of unknown input data values, the machine learning model in the form of the artificial neural network (ANN) having been previously trained by an iterative training phase in which the machine learning model in the form of the artificial neural network (ANN) is iteratively trained by generating a first learned parameter for use in normalizing a plurality of known input data values during an inference phase of the trained artificial neural network (ANN), the iterative training including updating the machine learning model in the form of the artificial neural network (ANN) based on the training by updating the first learned parameter in dependence upon a first gradient of a derived error value with respect to an approximation of the first learned parameter and training the artificial neural network (ANN) by repeating the iterative training until the iterative training has used all batches of training data values of a series of batches of known training data values, and the method pf operating the machine learning model in the form of an artificial neural network (ANN) to process a plurality of unknown input data values comprising:
during the inference phase:
collecting an input data value of the plurality of unknown input data values;
providing the collected input data value of the plurality of unknown input data values to the trained artificial neural network (ANN); and
normalizing, using the trained artificial neural network (ANN), the input data value by applying a bit shift equivalent to multiplying each input data value by a scaling factor, the scaling factor being a value equal to an integer power of two.

14. Computer software which, when executed by a computer, causes the computer to implement the method of claim 13.

15. A non-transitory machine-readable medium which stores computer software according to claim 14.

16. The method according to claim 13, further comprising providing the first learned parameter and the second learned parameter to the circuitry for processing during the inference phase, wherein the first learned parameter is for normalizing the input data value during the inference phase, and the first learned parameter and the second learned parameter are generated during the iterative training phase of the artificial neural network (ANN), which includes:
for each of the series of batches of known training data values, deriving a batch variance of the batch of known training data values and the running variance of all of the known training data values already processed in the iterative training phase,
generating the approximation of a current value of the first learned parameter so that a first scaling factor dependent upon the approximation of the first learned parameter and the running variance, is constrained to be equal to a power of two,
normalizing the batch of known input data values by a second scaling factor dependent upon the approximation of the current value of the first learned parameter and the batch variance,
deriving the error value, and
updating the first learned parameter in dependence upon the first gradient of the error value with respect to the approximation of the first learned parameter.

17. A system configured to process a plurality of unknown input data values using a machine learning model in the form of artificial neural network (ANN), the machine learning model in the form of the artificial neural network (ANN) having been previously trained by an iterative training phase in which the machine learning model in the form of the artificial neural network (ANN) is iteratively trained by generating a first learned parameter for use in normalizing a plurality of known input data values during an inference phase of the trained artificial neural network (ANN), the iterative training including updating the machine learning model in the form of the artificial neural network (ANN) based on the training by updating the first learned parameter in dependence upon a first gradient of a derived error value with respect to an approximation of the first learned parameter and training the artificial neural network (ANN) by repeating the iterative training until the iterative training has used all batches of training data values of a series of batches of known training data values, and the system to process the plurality of unknown input data values using the machine learning model in the form of artificial neural network (ANN) comprising:
circuitry configured to perform the following operations during the inference phase:
collect an input data value of the plurality of unknown input data values, provide the collected input data value of the plurality of unknown input data values to the trained artificial neural network (ANN), derive, using the trained artificial neural network (ANN), a scaling factor in dependence upon the approximation of the first learned parameter and a running variance of all of the training values applicable to the entire iterative training phase, and normalize, using the trained artificial neural network (ANN), the input data value by applying a bit shift equivalent to multiplying each input data value by the scaling factor, the scaling factor being a value equal to an integer power of two.

18. The system according to claim 17, wherein the circuitry includes a set of logic elements, the set of logic elements not including multiplier elements.

* * * * *